United States Patent [19]

Singletary

[11] 4,418,426
[45] Nov. 29, 1983

[54] EMERGENCY CITIZENS' BAND RADIO SYSTEM

[76] Inventor: Alger E. Singletary, 1948 Esperanza Dr., Concord, Calif. 94520

[21] Appl. No.: 215,448

[22] Filed: Dec. 11, 1980

[51] Int. Cl.³ .................... H04B 17/00; H04B 1/38
[52] U.S. Cl. ........................... 455/67; 455/74; 455/127; 455/343
[58] Field of Search ............ 455/73, 74, 89, 67, 455/115, 127, 226, 343, 88

[56] References Cited

U.S. PATENT DOCUMENTS

| | | | |
|---|---|---|---|
| 3,566,272 | 2/1971 | Goldbach | 455/127 |
| 3,969,673 | 7/1976 | Nordlof | 455/89 |
| 4,048,564 | 9/1977 | Gleeson, Jr. | 455/67 |
| 4,072,900 | 2/1978 | Ray | 455/67 |

*Primary Examiner*—Jin F. Ng
*Attorney, Agent, or Firm*—James G. O'Neill

[57] ABSTRACT

An emergency, CB radio system is disclosed which includes a base station adapter having a wall mounted slide mount for a mobile CB transceiver and an emergency power supply for supplying power to the CB transceiver, the emergency power supply including a rectifier for rectifying line voltage, an internal battery and charger, automatic switching means for switching the transceiver to the internal battery when the line voltage fails, and a jack for patching the transceiver to an external battery when the internal battery is discharged. The base station adapted also includes complete instrumentation for optimizing the performance of the transceiver and its associated antenna. The system further includes remote operating units for operating the transceiver via remotely located microphones and speakers, and a switching center interconnecting the remote operating units and the base station adapter.

4 Claims, 4 Drawing Figures

EMERGENCY CITIZENS' BAND RADIO SYSTEM

BACKGROUND OF THE INVENTION

1. Field of the Invention

My invention relates to radio transmitting and receiving systems, and more particularly to Citizens' Band (CB) radio systems adapted for use under emergency conditions.

2. Description of the Prior Art

The alternative use of a mobile CB radio transceiver in the owner's automobile or home stereo system is suggested, for example, in U.S. Pat. No. 4,100,372. Devices combining several well-known testing means for testing CB radios are known in the prior art, e.g., in U.S. Pat. Nos. 4,072,900 and 4,048,564. However, none of these prior art patents shows or discloses, in a dwelling or other building, an emergency CB radio system adapter comprising test equipment for optimizing the performance of a mobile CB transceiver, power supply means for supplying power to a mobile CB transceiver both when line voltage is available and when line voltage is unavailable, and a slide mount and other quick-connection means whereby a mobile CB transceiver, taken from a vehicle, can be rapidly connected thereto.

SUMMARY OF MY INVENTION

Accordingly, it is an object of my invention to provide a stationary base adapter whereby a mobile CB transceiver taken from a vehicle may quickly and easily be converted to operation as a base station.

It is a further object of my invention to provide a stationary base adapter having testing facilities for optimizing the performance of a mobile CB transceiver as a base station and also having power supply means for supplying operating power to that mobile CB transceiver, even when line power becomes unavailable.

It is another object of my invention to provide a stationary base adapter system including a plurality of remote operating units.

It is an additional object of my invention to provide a stationary base adapter, including emergency power supply facilities operating from an internal battery, the circuit of which is specially adapted to minimize drain from the internal battery during operating time when line voltage is unavailable.

It is yet another object of my invention to provide, in such a stationary base adapter, means for automatically suppressing the operation of the pilot lights of the remote operating units during internal battery operation.

It is a yet further object of my invention to provide, in such a stationary base adapter, ready means whereby power can be derived from an external battery when the charge stored in the internal battery has been fully used, without risk of damage to the internal battery.

It is yet another object of my invention to provide, in such a stationary base adapter, means whereby the failure of line power, e.g., late at night, and the resulting switching to internal battery power, will not bring about the operation of the transceiver.

It is a particular object of my invention to provide means by which a mobile CB transceiver can be used as an emergency communication system for summoning police and other assistance to a home even after an intruder has cut the electrical power and telephone lines serving that home.

Other objects of my invention will in part be obvious and will in part appear hereinafter.

My invention, accordingly, comprises the apparatus embodying features of construction, combinations of elements, and arrangements of parts exemplified in the following disclosure, and the scope of my invention will be indicated in the appended claims.

In accordance with a principal feature of my invention, a stationary base adapter is provided for adapting a mobile CB transceiver to operate as a base station, said stationary base adapter including testing means for optimizing the performance of the mobile CB transceiver and emergency power supply means for supplying operating power to said mobile CB transceiver, even when the line voltage fails.

In accordance with another principal feature of my invention, certain connections between said mobile CB transceiver and said stationary base adapter are part of a slide mount into which the mobile transceiver can be readily fitted and locked for fixedly positioning the mobile transceiver and at the same time making said certain connections.

In accordance with yet another principal feature of my invention, said stationary base adapter is provided with one or more remote operating units embodying certain features of my invention.

In accordance with yet another principal feature of my invention, said stationary base adapter circuit comprises an internal battery for supplying power to said transceiver during emergency conditions, and means for minimizing the drain of charge from said internal battery.

For a fuller understanding of the nature and objects of my invention, reference should be had to the following detailed description, taken in connection with the accompanying drawings.

DESCRIPTION OF THE PREFERRED EMBODIMENT

Figure 1:
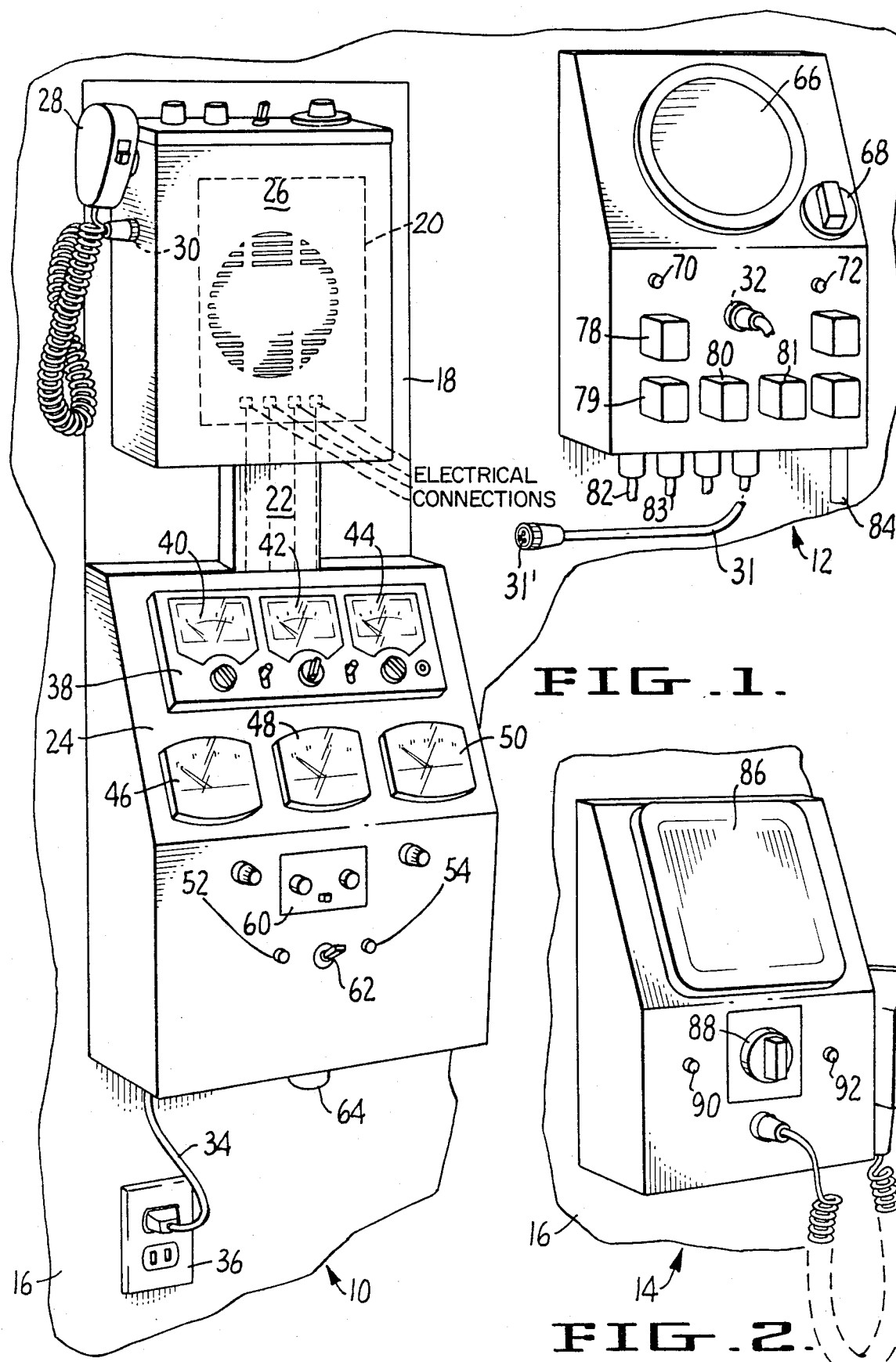
FIG. 1 is a perspective view of a base adapter unit and switching center unit constructed in accordance with my invention.

Referring now to the drawings, taken together, there is shown therein an emergency CB radio system constructed in accordance with my invention.

Figure 2:
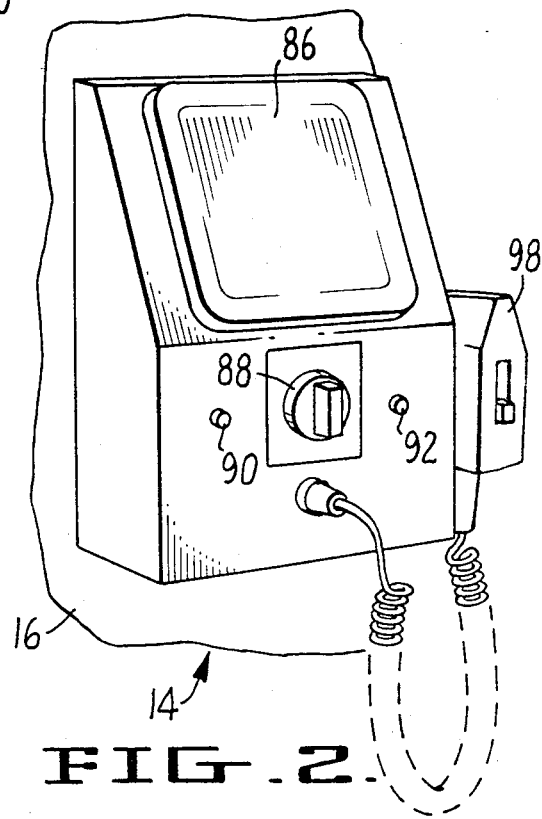
FIG. 2 is a perspective view of a remote operating unit adapted for operation with the base adapter unit and switching center unit of FIG. 1.
Figure 3:
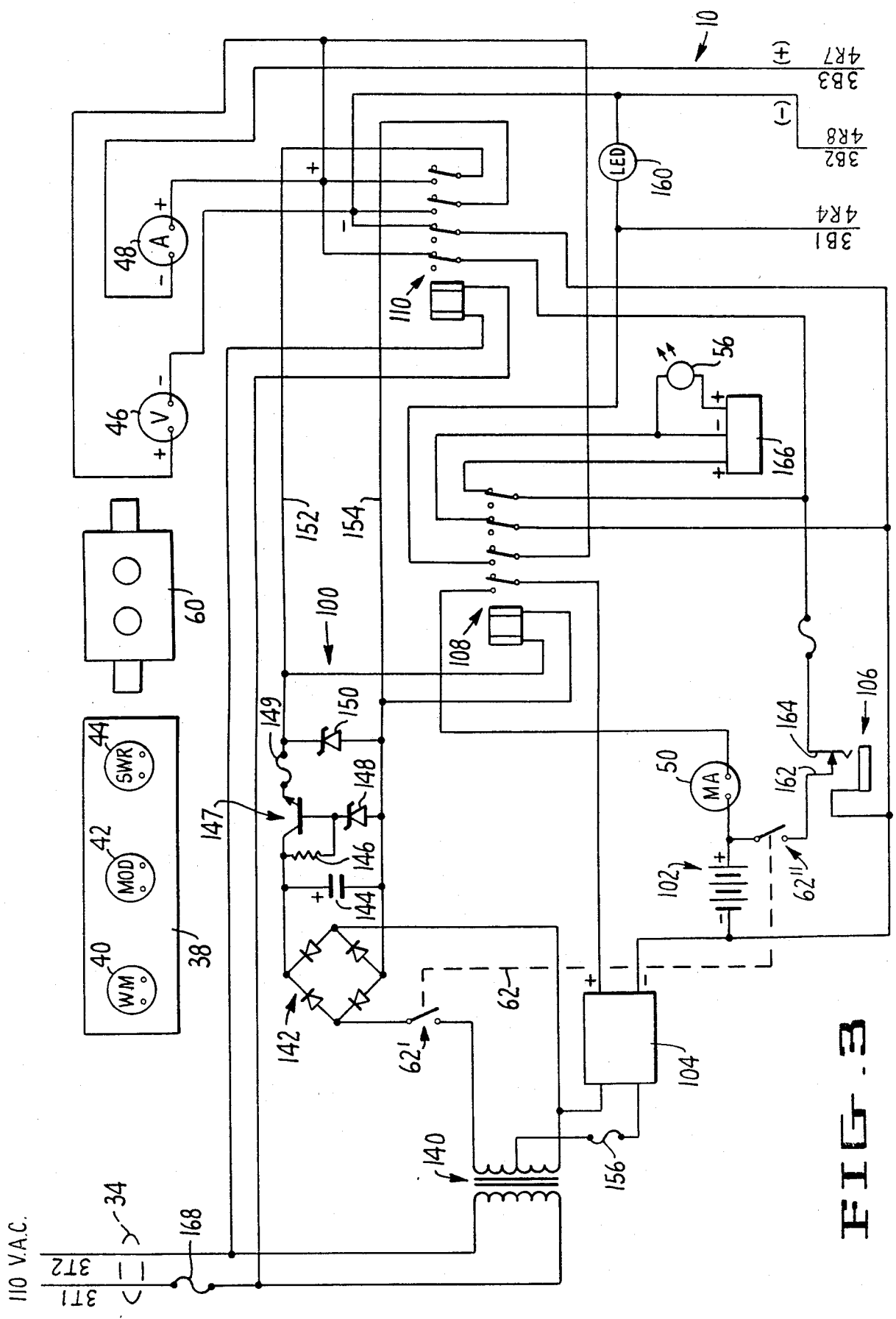
FIG. 3 is a schematic representation of the circuit of the base adapter unit of FIG. 1.
Figure 4:
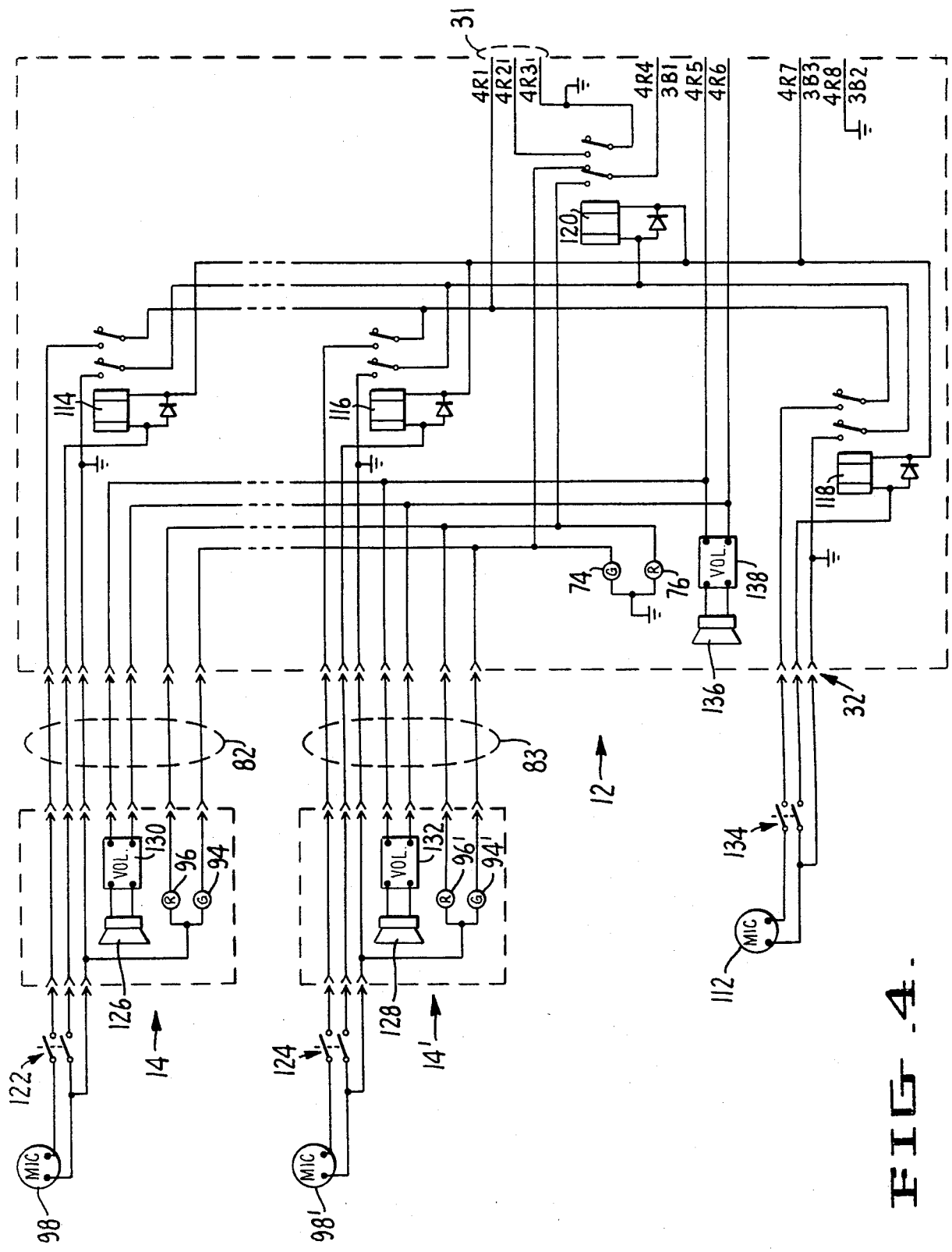
FIG. 4 is a schematic representation of the circuits of the switching center unit of FIG. 1 and remote operating units like the remote operating unit of FIG. 2.

This embodiment of my invention comprises a base adapter unit 10 (FIG. 1), a switching center unit 12 (FIG. 1), and one or more remote operating units 14, the exterior of one of which is shown in FIG. 2. The circuit elements and interconnections of base adapter 10 are shown in FIG. 3. The circuit elements and interconnections of switching center 12 are shown in FIG. 4. The circuit elements and interconnections of two remote operating units 14, 14' are shown in FIG. 4.

Referring now to FIG. 1, it will be seen that base adapter 10 is mounted on a wall 16. The mounting of base adapter 10 on wall 16 may be readily accomplished by those having ordinary skill in the art by the use of well-known expedients, and thus is not described in detail herein.

A flat metal apron 18, which is a part of base adapter 10 and is integral therewith, lies flat against wall 16 when base adapter 10 is mounted thereupon, and serves to protect wall 16, and also to carry a mobile CB radio slide mount 20 of the well-known kind, exemplified in U.S. Pat. No. 4,050,767. A hollow metallic trunk member 22 is affixed to apron 18 and contains electrical connections extending from slide mount 20 to the cabinet 24 of base adapter 10. Such electrical slide mount connections, including antenna leads, grounds leads, and power leads, are well-known to those having ordinary skill in the art (see, for example, U.S. Pat. No. 4,050,767).

As also seen in FIG. 1, a mobile CB radio transceiver 26 is mounted on apron 18, by means of slide mount 20.

While a simple and relatively inexpensive form of CB radio transceiver 26 is shown in FIG. 1, it is to be understood that emergency CB radio systems embodying my invention may also be adapted to include more powerful and elaborate CB radio transceivers, e.g., a 40-channel AC-DC single sideband CB radio transceiver of well-known type and manufacture. It is also to be noted that the circuit of base adapter 10 is capable of providing sufficient power etc., for such a 40-channel transceiver.

Referring again to FIG. 1, it will be seen that transceiver 26 is equipped with a microphone 28 of the well-known type used in connection with CB radios, etc. It is to be understood that in the emergency CB radio system of the present embodiment of my invention microphone 28 is connected to transceiver 26 via microphone jack 30 only when there are no remote operating units 14, 14' in use. When one or more remote operating units 14, 14' are to be used, microphone 28 will be connected instead to switching center unit 12 by means of microphone jack 32 (FIG. 1), and switching center unit 12 will be connected to transceiver 26 by means of cable 31, the connector 31' at the end of which is then connected to the microphone jack 30 of transceiver 26.

Referring again to FIG. 1, it will be seen that local AC power, or house current, is supplied to the circuit of base adapter 10 by means of a suitable power cord 34 the plug of which is inserted into a wall receptacle 36.

As also seen in FIG. 1, a panel 38 carrying three indicating meters 40, 42, 44 is mounted in the slanted front face of cabinet 24. Meters 40, 42, and 44 are of types well-known for use in monitoring the operation of radio transmitters, thus, meter 40 is a watt meter, meter 42 is a modulation meter, and meter 44 is a standing wave ratio meter, all of well-known type. By way of example only, panel 38 and its meters 40, 42, and 44 may be a three-range power-modulation-standing wave ratio tester of the kind sold by the Radio Shack Division of the Tandy Corporation under the tradename Micronta, and the catalog number 21-522. The manner of interconnecting such meters with a transceiver and its associated antenna is well-known to those having ordinary skill in the art, being described, for example, in the instructional literature accompanying said Micronta three-range power-modulation-standing wave ratio tester. For this reason, the interconnections between the meters and other devices mounted on panel 38, transceiver 26, and its associated antenna (not shown) will not be described in detail herein. It is, however, to be understood that in the present embodiment of my invention transceiver 26 and its associated antenna are suitably interconnected with meters 40, 42, and 44, and the other electrical elements mounted on panel 38, in order to permit monitoring of the operation of transceiver 26.

Referring again to FIG. 1, and more particularly to base adapter 10, it will be seen that three meters 46, 48, 50 are mounted in the slanted front face of cabinet 24 directly beneath panel 38. As will be described below in connection with FIG. 3, meters 46, 48, and 50 are provided for monitoring the operation of the circuit contained in cabinet 24.

Meter 46 is, for example, a 15-volt DC meter of the D'Arsonval type, connected to indicate the magnitude of the voltage supplied to transceiver 26 by the circuit of base adapter 10, via leads extending through trunk 22.

Meter 48 is, e.g., a 5-ampere ammeter of the D'Arsonval type, connected to indicate the magnitude of the current supplied to transceiver 26 by base adapter 10, via leads extending through trunk 22.

Meter 50 is, e.g., a milliammeter of the D'Arsonval type, connected to indicate the rate of charge and discharge of the rechargeable battery which is part of base adapter 10.

As further seen in FIG. 1, pilot lamp lenses 52 and 54 are mounted in the vertical front panel of cabinet 24.

Located behind lens 52 is a light emitting diode LED which is the LED of an LED flasher unit 56 (FIG. 3), e.g., an LED flasher unit sold by the Radio Shack Division of the Tandy Corporation under catalog number 276-036. As will become evident hereinafter to those having ordinary skill in the art, LED flasher unit 56 is connected to flash whenever the supply of alternating current voltage to the circuit of base adapter 10 is interrupted. As has proved desirable in the actual practice of my invention, LED flasher unit 56 is arranged to flash when the plug of power cord 34 (FIG. 1) is removed from receptacle 36.

Located behind lens 54 is a 12-volt LED pilot lamp 58, which is connected as shown in FIG. 3, and thus is illuminated whenever energizing power is being supplied to the pilot lights of the switching center 12 and the remote operating units 14 of the present embodiment of my invention.

Also mounted in the vertical front panel of cabinet 24, as seen in FIG. 1, is a tunable antenna matching unit 60, which may be of the kind sold by the Radio Shack Division of the Tandy Corporation. The mode of interconnecting such antenna matching units with associated antenna connections is well-known to those having ordinary skill in the art, being described at length in the literature accompanying said Radio Shack antenna matching units, and thus will not be described in detail herein. It is to be understood, however, that antenna matching unit 60 is connected in the known manner between the antenna lead passing through trunk 22 and an antenna which is part of the installation comprising base adapter 10. Thus, for example, a coaxial lead extending from a suitable CB antenna may pass through an opening in wall 16, and into the rear (wall side) of cabinet 24, whereafter it is connected to one of the coaxial terminals of antenna matching unit 60. The other coaxial terminal of matching unit 60 is connected to the meters, etc., of panel 38 in the well-known manner, and those meters, etc., are connected with the antenna lead extending through trunk 22, all in the well-known manner. This and other modes of interconnecting the antenna which is part of the installation comprising base adapter 10, antenna matching unit 60, meters 40, 42, and 44, etc., and the antenna lead of transceiver 26 which extends through trunk 22 will be obvious to those having ordinary skill in the art, and thus will not be described in detail herein.

Also mounted on the vertical front face of cabinet 24 (FIG. 1) is a manually operable switch 62 which is the main power switch of base adapter 10.

Projecting from the bottom of cabinet 24 is a jack 64 by means of which an external battery can be interconnected with the circuit of base adapter 10.

Referring further to FIG. 1, it will be seen that switching center unit 12 comprises a speaker 66 and a volume control 68 for manually regulating the volume of sound emitted by speaker 66. A pair of pilot light lenses 70 and 72 are mounted on the vertical front face of switching unit 12; lens 70 being a green lens and lens 72 being a red lens.

Located immediately behind green lens 70 is a pilot light 74 (FIG. 4), and located immediately behind red lens 72 is a pilot light 76 (FIG. 4). As will be evident to those having ordinary skill in the art from FIG. 4, green lens 70 will be illuminated by its associated pilot light 74 whenever the remote operating system consisting of switching center unit 12 and remote units 14, etc., are ready for operation; and red lens 72 will be illuminated by its associated pilot lamp 76 whenever any of the mikes of this remote operating system is being used to transmit voice signals.

As also seen in FIG. 1, switching center 12 is provided with a plurality of relays 78, 79, 80, 81, the function of which will be obvious to those having ordinary skill in the art from FIG. 4. Further, switching center 12 is provided with external connections 82, 83, whereby switching center 12 is connected to the remote operating units 14, etc., shown in FIGS. 2 and 4.

In some embodiments of my invention these interconnections will initially pass through wall 16 behind switching center 12, and will be "snaked" through the walls of the building to the remote units 14. Switching unit 12 (FIG. 1) is also provided with a connecting cable 84 for interconnecting its circuit with the circuit of base adapter 10 and the circuit of transceiver 26. This interconnection, like those described immediately above, may be passed through the walls of the building of which wall 16 is a part.

Referring now to FIG. 2, it will be seen that the remote operating units 14, 14' each comprises a speaker 86 and a volume control 88 for controlling the volume of sound emitted by the speaker.

Further, each remote operating unit 14, 14' comprises a green pilot lamp lens 90, 90' and a red pilot lamp lens 92, 92'. The pilot lamps 94 and 96 (and 94' and 96') of FIG. 4 are connected and arranged to function in the same manner as the pilot lamps 74 and 76, as described above.

Yet further, each remote operating unit 14, 14' is provided with a connector for a microphone 98, of a type well-known for use in connection with CB radio systems.

Referring now to FIGS. 3 and 4, there is shown the circuit of the emergency CB radio system of my invention shown in FIGS. 1 and 2.

In addition to the meters, etc., described above in connection with FIG. 1 and 2, this embodiment of my invention comprises (FIG. 3) rectifier circuit 100, a rechargeable battery 102, a battery charger 104 for charging battery 102, an external battery jack 106 for use when line power has been unavailable for an extended period of time, a direct current relay 108, and an alternating current relay 110.

The present embodiment of my invention further comprises (FIG. 4) a plurality of remote microphones 98, 98' a microphone 112 operatively connected to jack 32 of switching center 12, and suitable switching relays 114, 116, 118, 120. In the manner well-known to those having ordinary skill in the art, relay 114 is controlled by switch 122 which is a part of microphone 98, relay 116 is controlled by switch 124 which is a part of microphone 98', etc. Similarly, a speaker 126 is provided near microphone 98 for use in connection therewith, a speaker 128 is provided near microphone 98' for use in connection therewith, etc.

Further, each such speaker is provided with a suitable volume control, e.g., a well-known L-pad arrangement. Thus, volume control 130 controls the sound output level of speaker 126, volume control 132 controls the sound output level of speaker 128, etc. As will be evident to those having ordinary skill in the art, switching center 12, like remote operating units 14 and 14' just described, comprises a microphone (112—connected to jack 32 and provided with switch 134), a speaker (136), and a volume control (138).

The circuit of FIG. 4, with the exception of the features thereof described in detail herein, is of well-known type, and the operation thereof will be obvious to those having ordinary skill in the art, informed by the present disclosure.

The interconnections between the circuits of FIGS. 3 and 4 and transceiver 26 are indicated by legends placed above, and sometimes also below, the leads which terminate at the edges of the figures. A legend placed above such a lead and having the same left-hand numeral as the figure in which it is found designates the lead above which it is placed. For example, lead 4R1 of FIG. 4 is the uppermost lead at the right-hand edge of FIG. 4, lead 4R2 is the next-to-uppermost lead at the right-hand edge of FIG. 4, etc.

Similarly, lead 3B1 is the leftmost lead at the bottom or lower edge of FIG. 3, and lead 3B2 is the second-from-the-left lead at the bottom or lower edge of FIG. 3.

The designation of certain interconnections between these leads by means of the legends associated therewith will be understood by consideration of leads 3B1 and 4R4. In FIG. 3 the legend 4R4 is placed under lead 3B1. In FIG. 4 the legend 3B1 is found under lead 4R4. Thus, it is to be understood that a direct, conductive connection of substantially zero impedance extends between lead 3B1 of FIG. 3 and 4R4 of FIG. 4.

Similarly, it will now be seen by those having ordinary skill in the art that a direct, conductive connection of substantially zero impedance exists between lead 3B2 of FIG. 3 and lead 4R8 of FIG. 4. In the same way, it will be seen that a direct, conductive connection of substantially zero impedance exists between lead 3B3 of FIG. 3 and lead 4R7 of FIG. 4.

The circuit of FIG. 3 is provided with two additional leads, viz., 3T1 and 3T2, which are conductors of power cord 34 (FIG. 1), whereby the circuit to FIG. 1 is connected to an AC power line via receptacle 36, etc.

As indicated by the positive and negative signs found next to them, it is to be understood that leads 3B2 and 3B3 are the principal output terminals of the base adapter circuit of FIG. 3. Thus, leads 3B2 and 3B3 are not only connected to leads 4R8 and 4R7 of FIG. 4, but are also connected to the power input terminals of transceiver 26 (FIG. 1), by way of conductors which extend through trunk 22. In other words, base adapter 10 supplies operating power to transceiver 26 via conductors extending through trunk 22.

As will also be evident to those having ordinary skill in the art, the speakers 136, etc. are provided with audio exciting signals via leads 4R5 and 4R6, and leads 4R5 and 4R6 are directly, conductively connected to the audio output terminals of transceiver 26 via cable 84, conductors running through trunk 22, etc.

In accordance with a particular feature of my invention, terminals 4R1, 4R2, and 4R3 of FIG. 4 are connected to the microphone jack 30 of transceiver 26 by means of cable 31 (FIG. 1) which is provided with a microphone connector or plug 31' adapter to coact with microphone jack 30. The pins of connector 31' to which the respective leads 4R1, 4R2, and 4R3 are to be connected will be obvious to those having ordinary skill in the art, informed by the present disclosure. As will be obvious to those having ordinary skill in the art, lead 4R1 will be connected to audio pin socket of jack 30, lead 4R2 will be connected to the relay connection pin socket of jack 30, and lead 4R3 will be connected to the ground pin socket of jack 30.

Cable 31 may, of course, be "snaked" through wall 16 and brought out adjacent transceiver 26, or through a wall of trunk 22, all within the scope of my invention.

As shown in FIG. 3, direct current supply circuit 100 comprises a transformer 140, e.g., a Thordarson 115 volt/24 volt transformer with center tapped secondaries; a rectifier bridge, e.g., a solid state EGC5312 bridge of 8 ampere current capacity and rated at 100 PRV; a capacitor 144, e.g., of 2,000 microfarad capacity, rated at 50 volts; a 75 ohm, 10-watt resistor 146; an ECG130 transistor 147; an ECG5190 14-volt Zener diode 148; a 4-ampere fuse 149; and an ECG5133 18-volt Zener diode 150; all interconnected as indicated in FIG. 3. This combination of elements, connected as shown, provides an approximate 14-volt direct current potential between leads 152 and 154, and a maximum current of approximately 3 amperes. The circuit of FIG. 3 is so constructed and arranged that leads 152 and 154 are connected to leads 3B2 and 3B3 when the alternating current line voltage exists between leads 3T1 and 3T2.

As also shown in FIG. 3, battery charger 104 is connected across half of the secondary of transformer 140, with a fuse 156 (1 ampere, 12 volt AC) connected between the transformer center tap and one of its terminals. Battery charger 104 may be a 12 VAC/12 VDC Microstate PS4 battery module.

Battery charger 104 is connected to charge rechargeable battery 102, which may be a 12 volt NP lead-acid battery of the kind made by the Yuasa Battery Company (America) under the designation NP612, having an output rating of 6 ampere-hours.

Relay 108 (FIG. 3) may be a four-pole, double-throw relay of well-known type, the coil of which is wound to be energized by a 14 volt source. Relay 110 may be a four-pole, double-throw, 115 volt AC Potter-Brumfield relay, identified by the stock number RIO-EI-4. Pilot light 160 of FIG. 3 may be a suitable 12 volt light emitting diode. When the system of my invention is used with certain transceivers, external battery jack 106 may be a high-quality phone jack of the type in which the insertion of the associated phone plug opens an internal connection before the plug is fully seated. When other transceivers are used in connection with the emergency CB radio system of my invention, however, it may be necessary to use a jack of higher current carrying capacity than a standard, high-quality phone jack, but which operates electrically in the same manner. As also seen in FIG. 3, flashing light emitting diode 56, described hereinabove, is supplied with properly regulated energizing voltage by means of a three-pin, five-volt regulator 166, such as is sold by the Radio Shack Division of the Tandy Corporation under catalog number 276-1770. Fuse 168 of FIG. 3 may be a one-ampere fuse.

OPERATION

Considering first the mode of operation of the base adapter circuit of FIG. 3 when alternating voltage is present at leads 3T1 and 3T2, it will be understood by those having ordinary skill in the art, informed by the present disclosure, that switch 62 must be closed in order to energize bridge 142.

During this "line mode" of operation of base adapter 10, the charging circuit including charger 104 and battery 102 is completed through the leftmost contacts of relay 108, and the supply voltage on terminals 3B2, 3B3 is provided by rectifier 100 through contacts of relay 110. Also, during line mode operation, the energizing circuit of regulator 166, which includes contact sets of relay 108, is broken by relay 108, and thus flashing light emitting diode 56 does not flash.

Yet further, during line mode operation, lead 3B1 is connected to the positive terminal of rectifier 100 through a contact set of relay 108, and thus incandescing current is supplied to those of pilot lamps 94, 96, 94', 96', 74 and 76 (shown in FIG. 4) which are selected by the relays 114, 116, 118, 120 of FIG. 4.

When the alternating current voltage on terminals 3T1 and 3T2 ceases to exist, the base adapter circuit 10 of FIG. 3 automatically goes into its "internal battery mode" operation.

During internal battery mode operation both of the relays 108 and 110 are de-energized, and thus the charging circuit comprising battery charger 104 and battery 102 is opened, preventing the draining of internal battery 102 through battery charger 104, in accordance with a principal feature of my invention.

During internal battery mode operation, the terminals of internal battery 102 are connected to leads 3B2 and 3B3 through closed contact sets of relay 110, through closed manual switch 62, and through the closed internal contacts 162, 164 of jack 106.

In accordance with another principal feature of my invention, regulator 166 is connected across the terminals of internal battery 102 via two closed contact sets of relay 108, and thus regulator 166 is energized, and flashing light emitting diode 56 flashes throughout the internal battery mode of operation.

In accordance with yet another principal feature of my invention, lead 3B1 is isolated from its associated (positive) terminal of internal battery 102, during internal battery mode operation, by means of an open contact set of relay 108, and thus the pilot lamps 94, 96, 94', 96', 74, and 76 of FIG. 4 cannot drain battery 102.

In the third or "external battery mode" of operation of my invention, voltage is maintained on leads 3B2 and 3B3 by means of an external battery the terminals of which are connected to the contacts of a plug engaged with jack 106.

In accordance with a principal feature of my invention, jack 106 and its cooperating plug are so constructed and arranged that when the plug is fully engaged with jack 106 the contacts 162, 164 of jack 106 are held open, and thus internal battery 102 is isolated from the external battery circuit, its output circuit is opened, and drainage of the external battery is prevented.

In accordance with another principal feature of my invention, line power switch 62 takes the double-pole, single-throw form shown in FIG. 3, in which contact set 62" disconnects internal battery 102 from positive lead 3B3 whenever contact set 62' disconnects bridge 142 from power transformer 140. By this means, in accordance with my invention, transceiver 26, etc., cannot be activated at undesired times, e.g., during the early hours of the morning, upon the loss of line voltage, which would be the case if power switch 62 included only contact set 62'.

It will thus be seen that the object set out hereinabove, among those made apparent from the preceding description, are efficiently attained, and since certain changes may be made in the above constructions without departing from the scope of my invention, it is intended that all matter contained in the above description or shown in the accompanying drawings shall be interpreted as illustrative only, and not in a limiting sense.

It is also to be understood that the following claims are intended to cover all of the specific and generic features of my invention, and all statements of the scope of my invention which, as a matter of language, might be said to fall therebetween.

What I claim as new and desire to secure by Letters Patent is:

1. An emergency Citizens' Band radio system including a base station adapter, said base station adapter comprising:

an antenna electrical connection and a power supply electrical connection adapted to be respectively connected to an antenna lead connection and a power supply connection of a mobile Citizens' Band transceiver; rectifier means for rectifying line voltage and providing direct current power to said transceiver via said power supply electrical connection; battery means; battery charger means for charging said battery means; automatic switching means for connecting said battery means to said power supply electrical connection when said line voltage fails; system performance optimizing means connected to said antenna electrical connection for monitoring the operating condition of the transceiver; and at least one remote operating unit for remotely operating said transceiver, said remote operating unit comprising a pair of operating condition indicating lights, and means in said base station adapter for extinguishing said operating condition indicating lights when said line voltage fails.

2. A base station adapter as claimed in claim 1 in which said automatic switching means opens a charging circuit comprising said battery means and said battery charger means when said line voltage fails.

3. A base station adapter as claimed in claim 1, further comprising jack means for connecting external battery means to said power supply electrical connection.

4. A base station adapter as claimed in claim 1, further comprising manually operated switching means for disconnecting said rectifier means from said line voltage and disconnecting said battery means from said power supply electrical connection.

* * * * *